(12) United States Patent
Johnson et al.

(10) Patent No.: US 9,371,958 B2
(45) Date of Patent: Jun. 21, 2016

(54) ADJUSTABLE EQUIPMENT SUPPORT

(71) Applicants: Joseph M. Johnson, San Luis Obispo, CA (US); Matthew L. Burk, San Luis Obispo, CA (US)

(72) Inventors: Joseph M. Johnson, San Luis Obispo, CA (US); Matthew L. Burk, San Luis Obispo, CA (US)

(73) Assignee: Really Right Stuff, LLC, San Luis Obispo, CA (US)

( * ) Notice: Subject to any disclaimer, the term of this patent is extended or adjusted under 35 U.S.C. 154(b) by 0 days.

(21) Appl. No.: 14/247,096

(22) Filed: Apr. 7, 2014

(65) Prior Publication Data

US 2014/0299726 A1 Oct. 9, 2014

Related U.S. Application Data

(60) Provisional application No. 61/809,093, filed on Apr. 5, 2013.

(51) Int. Cl.
*F16M 11/00* (2006.01)
*F16M 11/32* (2006.01)
*F16M 11/16* (2006.01)

(52) U.S. Cl.
CPC ............... *F16M 11/32* (2013.01); *F16M 11/16* (2013.01); *F16M 2200/022* (2013.01)

(58) Field of Classification Search
USPC ............. 248/166, 168, 169, 434, 435, 177.1, 248/183.3
See application file for complete search history.

(56) References Cited

U.S. PATENT DOCUMENTS

| | | | | |
|---|---|---|---|---|
| 5,823,491 A | * | 10/1998 | Lindsay et al. | 248/169 |
| 5,933,191 A | * | 8/1999 | Ariga et al. | 348/373 |
| 7,385,127 B2 | * | 6/2008 | Sato | F16M 11/10 248/125.7 |
| 2004/0136775 A1 | * | 7/2004 | Chang | 403/64 |
| 2005/0274854 A1 | * | 12/2005 | May | 248/171 |
| 2006/0086871 A1 | * | 4/2006 | Joseph et al. | 248/178.1 |
| 2010/0218670 A1 | * | 9/2010 | Keng | 89/37.04 |

* cited by examiner

*Primary Examiner* — Steven Marsh
(74) *Attorney, Agent, or Firm* — Chernoff Vilhauer McClung & Stenfl, LLP

(57) ABSTRACT

A support for supporting equipment includes at least one elongate leg element at least partially supporting an apex selectively, detachably mountable to equipment, where the leg includes a first end proximate the apex and a second end distal the apex, and where the leg is pivotal about an axis proximate the first end throughout a limited arc. A securement assembly pivotably interconnects the first end of the leg with the apex. The securement assembly has selectable resistance to movement along the arc as a result of selectively increasing or decreasing the resistance between at least three friction plates having surfaces in face-to-face engagement with one another.

9 Claims, 3 Drawing Sheets

ADJUSTABLE EQUIPMENT SUPPORT

CROSS REFERENCE TO RELATED APPLICATIONS

This application claims the benefit of U.S. Provisional App. No. 61/809,093, filed Apr. 5, 2013.

BACKGROUND OF THE INVENTION

The present invention relates to a portable support apparatus for equipment, such as a tripod. For convenience, the term "tripod" is used as a generic identifier for a more broad class of equipment supports, which may have any number of legs, e.g. a support with two, three, four or more legs.

Tripods have been used for many years. Typically, tripods include an elevated mounting surface, upon which equipment may be secured, such as a camera, telescope, musical equipment, surveying equipment, antenna, etc. The elevated mounting surface is supported by a plurality of legs, which in the case of a tripod is typically three. Other numbers of legs may likewise be used, such as a single leg monopod.

Tripods are designed to provide some optimal balance between a set of features. For example, one feature of a tripod is stability, as it is often desirable to insure that shaking or other movement of equipment supported by the tripod is minimized so that, for example, blur does not occur in an image taken by a camera supported on the tripod. Tripods are often used portably, hence, it is often desired to minimize the weight and/or dimensions of the tripod so that it may be carried over great distances. Unfortunately, these stability and weight considerations are often in conflict, i.e. a heavier tripod will provide a high degree of stability but will be more burdensome to carry.

Many existing tripods are vertically collapsible with radially extendible legs. For example, a tripod may have three leg assemblies, with each leg assembly pivotally connected to an elevated equipment support so that each leg may be pivoted outwards when in use, and inwards when not in use. Also, each leg assembly may have multiple elements that selectively slide axially relative to each other. For example, a multi-stage tripod may have first, second, and third segments for each leg. To adjust the height of the tripod, the first and second leg segments are slidably movable relative to each other and the second and third leg segments are also slidably movable relative to each other. Each pair of legs may be selectively locked and unlocked at different positions. Tripods also may include an adjustable central column to change the height at which equipment is supported by the tripod at a fixed extension of the tripod legs. Further, the tripod legs typically include locking detents so that each of the tripod legs may be positioned at one of a plurality of fixed angular orientations. Unfortunately, the selected detents often do not provide the flexibility to position the tripod legs at the desired positions, especially when using the tripod on uneven or rocky terrain.

What is desired therefore is a modified tripod, and in particular a modified tripod leg, suitable for being adjustable to a desirable location.

DETAILED DESCRIPTION OF THE PREFERRED EMBODIMENTS

Figure 1:
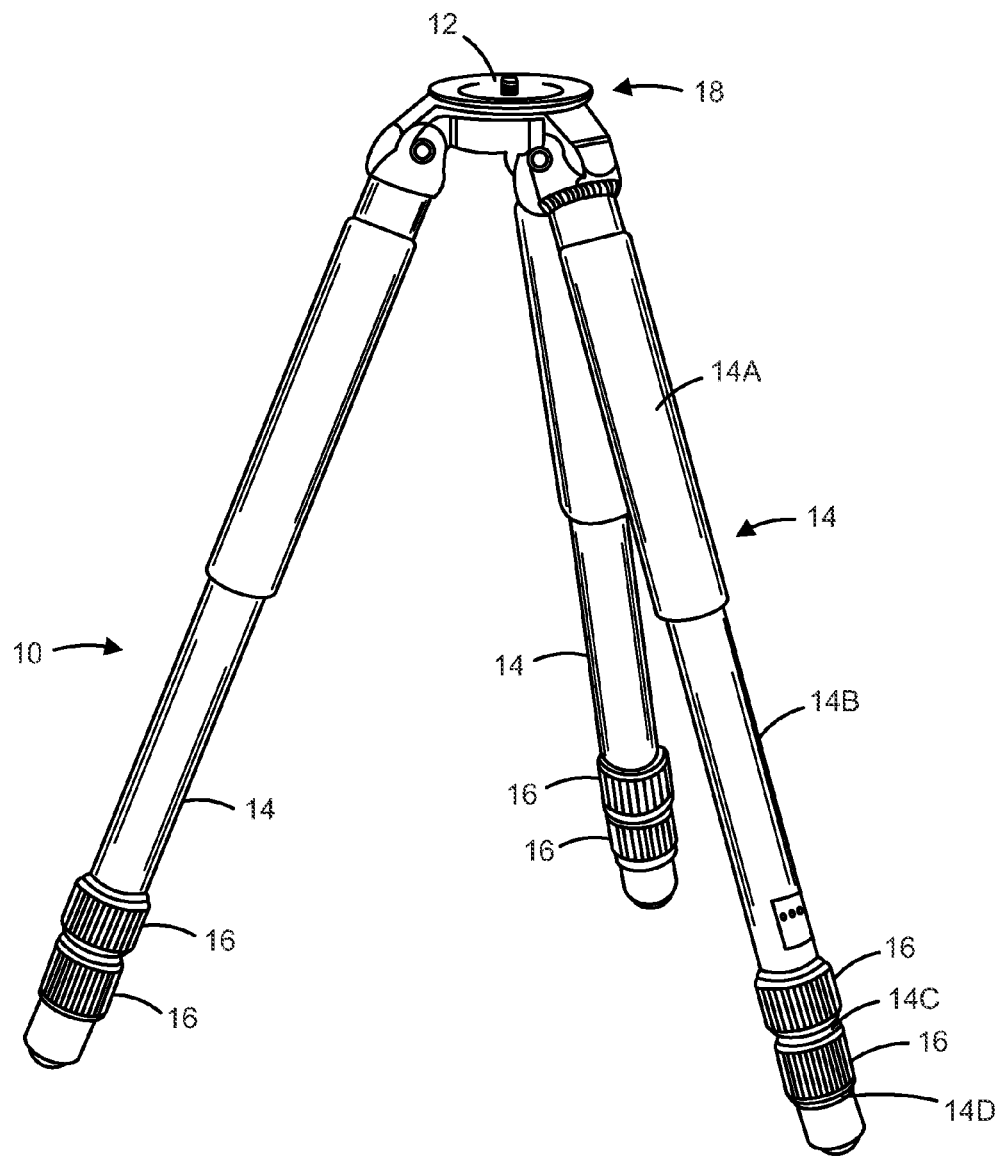
FIG. 1 illustrates a tripod.

FIG. 1 shows an exemplary tripod 10. Though features are discussed in reference to the depicted tripod, it should be understood that the features may be implemented in an equipment support having any number of legs. The tripod 10 may include a platform 12 for detachably securing equipment to the tripod 10 using a set screw or other attachment mechanism. The tripod 10 may include a plurality of legs 14 to support the platform 12 at an elevated position. The platform 12 may be detachably mounted within an apex 18 of the tripod, which may be a ring into which the platform 12 may be secured. Each of the legs 14 may include a plurality of telescoping leg sections that nest together in a retracted position by releasing an appropriate locking mechanism 16. Although the platform 12 is shown as having a fixed vertical position with respect to the apex 18, it is understood that the platform 12 may be supported by a vertically-extensible column slidably engaged with the apex 18. The platform 12 may include a spirit level. Each of the legs 14 preferably pivots about a respective axis proximate the apex 18. Through a selective choice of respective angles between each of the legs 14 and the apex 18, along with a desired telescoped length of each respective leg, equipment attached to the tripod 10 may be supported on a wide variety of terrain.

Two competing characteristics of tripod legs are stability and adjustability. To increase the stability of the tripod legs a discrete set of leg positions may be included to define the available secured positions for the tripod legs. However, such a limited number of secured positions for the tripod legs limits the usefulness of the tripod in rough environments.

Each of the legs 10 is preferably formed of carbon-fiber material selected for its light weight and high strength. The tripod legs 14 may include a plurality of hollow, nested telescoping sections where the largest section of each leg, into which the other leg sections selectively retract, is preferably less than approximately $3/32$ inches thick along a major portion of its length, more preferably less than approximately 0.08 inches thick along a major portion of its length, and even more preferably less than approximately 0.04 inches thick along a major portion of its length. The term "approximately" in this context means within a range of plus and/or minus 10%.

Figure 2:
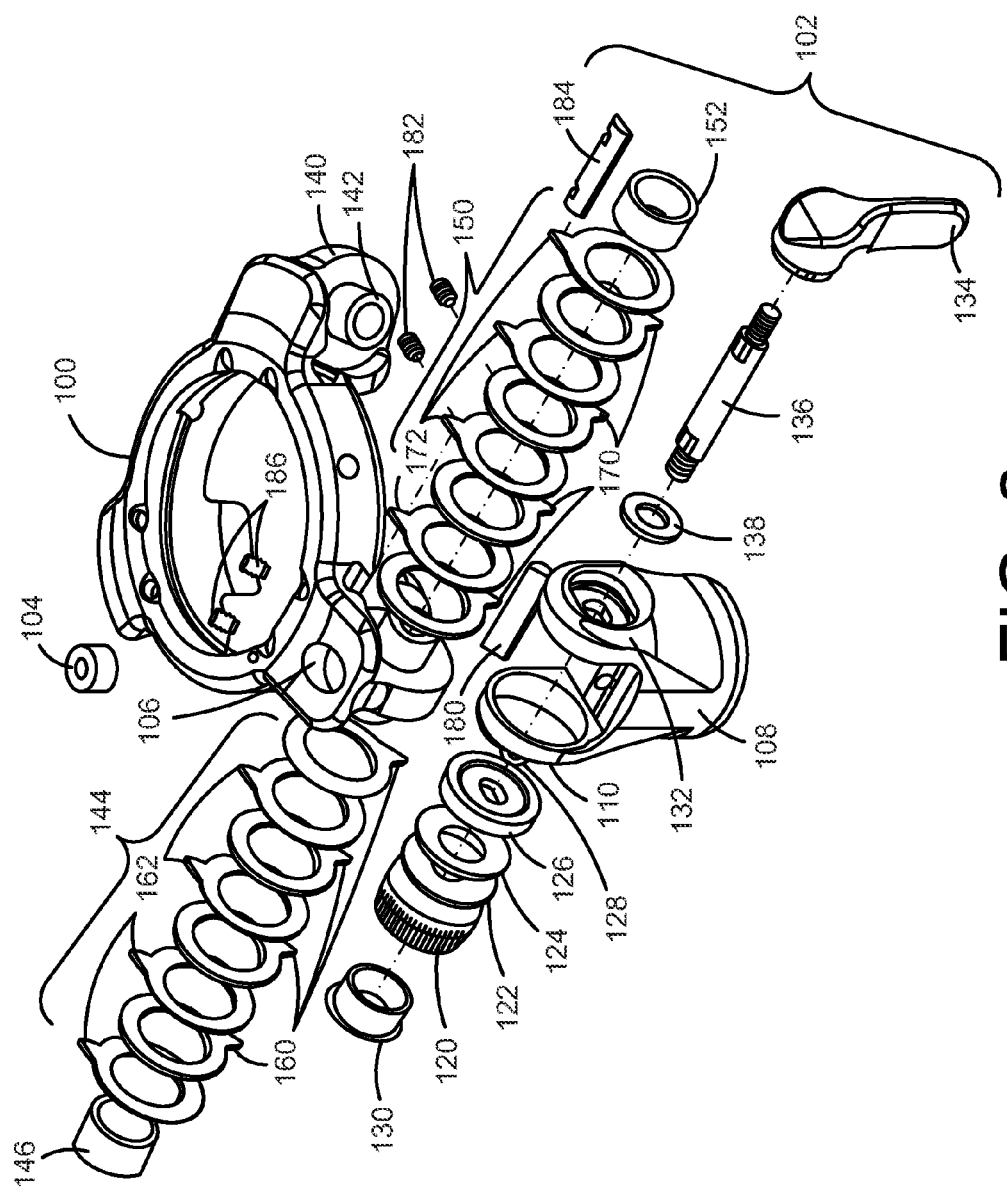
FIG. 2 illustrates a tripod apex together with a exploded view of a securement assembly.

Referring to FIG. 2, the apex 18 portion of the tripod of FIG. 1 is preferably replaced with a modified apex 100 and a modified securement assembly 102. The apex 100 includes a central region that can support an imaging device and/or a platform upon which the imaging device is supported. The apex 100 preferably includes a central circular opening defined therein. The apex 100 may include suitable interconnections for a plurality of securement assemblies 102, such as three securement assemblies. The securement assemblies 102 are each in turn interconnected to a respective leg of the tripod. The apex 100 may also include a level 104 that is secured within an opening 106 defined by the apex 100 so that the viewer can readily determine if the apex 100 is level.

The securement assembly 102 includes a clevis 108 which is rotatably interconnected with the apex 100 and rigidly interconnected with legs of the tripod. To a left housing 110 of the clevis 108 is a knob assembly including a tension knob 120, a knob washer 122, a Belleville washer 124, a piston 126, all of which is secured together with a screw 128. A cap 130 may be placed within the end of the knob 120 to cover the screw 128. To a right housing 132 of the clevis 108 is a lever assembly including a lever 134, an axle 136, and a level washer 138. The axel 136 is positioned between the right housing 132 and the left housing 110, with the screw 128 being secured to the axel 136 to secure the knob assembly and lever assembly to the clevis 108.

The apex 100 may include a set of supports 140 through which are included a cylinder 142 to support the securement assembly 102 thereon. A first set of friction plates 144 are supported on a bushing 146, which collectively are supported on the cylinder 142. Similarly, a second set of friction plates 150 are supported on a bushing 152, which collectively are supported on the other side of the respective cylinder 142. The friction plates 144, 150 are in face to face engagement with one another such that rotation of one plate with respect to another plate results in a frictional resistance to such movement. A first half of the first set of friction plates 144 include a lower set of protrusions 160, and a second half of the first set of friction plates 144 include an upper set of protrusions 162. The first and second halves of the first set may be the same, the difference being the rotation of the respective friction plates. A first half of the second set of friction plates 150 include a lower set of protrusions 170, and a second half of the first set of friction plates 150 include an upper set of protrusions 172. The first and second halves of the second set may be the same, the difference being the rotation of the respective friction plates. A wedge 180 is used together with a pair of set screws 182 to maintain the lower set of protrusions 160, 170 is a fixed position with respect to the clevis 108. A wedge 184 is used together with a pair of set screws 186 to maintain the upper set of protrusions 162, 172 in a fixed position with respect to the apex 100. Accordingly, part of the friction plates are maintained in a fixed position with respect to the apex 100 and the other part of the friction plates are maintained in a fixed position with respect to the clevis 108.

Each of the friction plates that have the upper set of protrusions are interspaced with each of the friction plates that have the lower set of protrusions in such a manner that there is a plurality of surfaces that may provide frictional resistance to movement along a two-dimensional range of motion when the securement assembly is secured to the apex. Rotating the screw knob selectively increases or decreases the frictional resistance by increasing or decreasing, respectively, the pressure exerted on the stack of friction plates. Thus with low resistance on the friction plates the control arm may be readily positioned. Then by turning the screw knob, the friction provided by the friction plates may be substantially increased to maintain the tripod leg in a desired position. Also, the frictional resistance is generally linear within the useful operating range of the screw knob.

Figure 5:
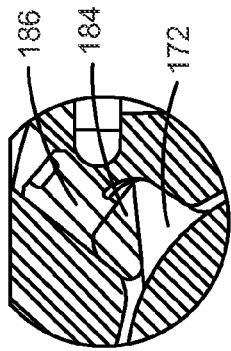
FIG. 5 illustrates a more detailed view along line 5 of FIG. 4.
Figure 4:
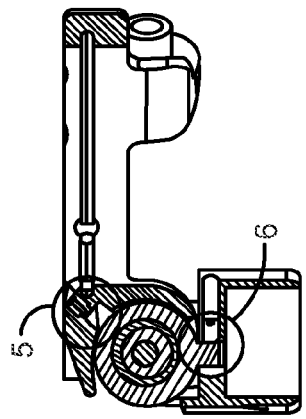
FIG. 4 illustrates a cut away view along line 4-4 of FIG. 3.
Figure 3:
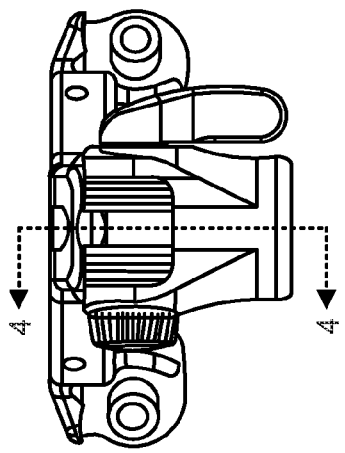
FIG. 3 illustrates a side view of the apex and securement assembly of FIG. 2.
Figure 6:
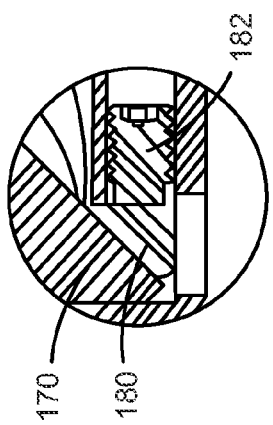
FIG. 6 illustrates a more detailed view along line 6 of FIG. 4.

Referring to FIG. 3, a side view of the apex 100 with one of the securement assemblies 102 in an assembled configuration is illustrated. Referring to FIG. 4, which is a cut away view along line 4-4 of FIG. 3, illustrates in particular more detail of the friction plate assembly. The friction plates are aligned with one another and maintained from substantial rotational movement by the respective screws and/or wedge. Referring also to FIG. 5, the right hand screw 186, together with the wedge 184, is illustrated as retaining the protrusions 172 in a fixed position. Referring also to FIG. 6, the right hand screw 182, together with the wedge 180, is illustrated as retaining the protrusions 170 in a fixed position.

Figure 8:
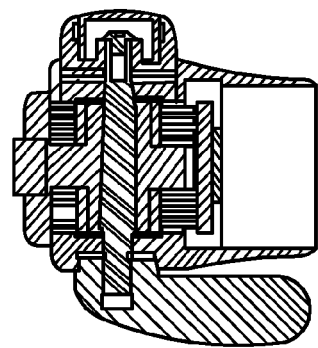
FIG. 8 illustrates a cut away along line 8-8 of FIG. 7.
Figure 7:
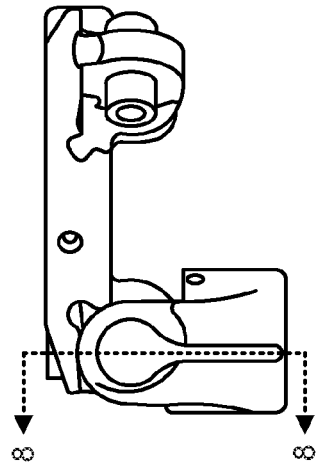
FIG. 7 illustrates an end view of the apex and securement assembly.

Referring to FIG. 7, an end view of the apex with one of the securement assemblies 102 in an assembled position is illustrated. Referring to FIG. 8, which is a cut away view along line 8-8 of FIG. 7, illustrates in particular the interrelationships between the friction plates.

With the flexible positioning of the tripod legs with respect to the apex, the imaging equipment may be placed in a precise location and located in that position. The positioning may be at any suitable position along the range of movement of the leg. Moreover, to reposition the leg the securement assembly may only be slightly loosened, the leg repositioned, and the leg secured in position.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A support for supporting equipment, said support comprising:
    (a) at least two elongate leg elements at least partially supporting an apex selectively, detachably mountable to equipment, where each of said legs includes a respective first end proximate said apex and a second end distal said apex, and where each of said legs is pivotal about an axis proximate said first end throughout a limited arc; and
    (b) a respective securement assembly pivotably interconnecting each of said first end of said legs with said apex;
    (c) each of said respective said securement assembly having an independently selectable resistance to movement along said arc at any said location along said limited arc as a result of selectively increasing or decreasing the resistance between at least three friction plates having surfaces in face-to-face engagement with one another.

2. The support of claim 1 wherein said securement assembly is securely affixed to an end portion of said first end of said leg, where said securement assembly is securely affixed to said apex.

3. The support of claim 2 wherein said securement assembly includes a rotatable knob to selectively said increase and decrease said resistance between said at least three friction plates.

4. The support of claim 3 wherein said rotatable knob includes a securement member positioned at least partially through said rotatable knob.

5. The support of claim 4 wherein said rotatable knob includes a cap enclosing an end of said securement member within said rotatable knob.

6. The support of claim 2 wherein said securement assembly includes a first plurality of at least two friction plates maintained in a fixed position with respect to one another.

7. The support of claim 6 wherein said securement assembly includes a second plurality of at least two friction plates maintained in a fixed position with respect to one another.

8. The support of claim 7 wherein each of said first plurality of friction plates are in said face-to-face engagement with respective ones of each of said second plurality of friction plates.

9. The support of claim 8 wherein said first plurality of friction plates and said second plurality of friction plates form a stack of friction plates arranged as a first one of said first plurality of friction plates, a first one of said second plurality of friction plates, a second one of said first plurality of friction plates, and a second one of said second plurality of friction plates.

\* \* \* \* \*